(12) United States Patent
Ellis (10) Patent No.: US 9,295,130 B2
(45) Date of Patent: Mar. 22, 2016

(54) SYSTEM AND METHOD FOR PROVIDING GRADIENT INTENSITY ILLUMINATION FOR LIGHTED MIRRORS FOR DRESSING ROOMS AND OTHER APPLICATIONS

(71) Applicant: Mary L. Ellis, Boulder, CO (US)

(72) Inventor: Mary L. Ellis, Boulder, CO (US)

( * ) Notice: Subject to any disclaimer, the term of this patent is extended or adjusted under 35 U.S.C. 154(b) by 0 days.

(21) Appl. No.: 14/254,188

(22) Filed: Apr. 16, 2014

(65) Prior Publication Data

US 2015/0305113 A1    Oct. 22, 2015

(51) Int. Cl.
| | |
|---|---|
| *H05B 33/08* | (2006.01) |
| *H05B 37/02* | (2006.01) |
| *F21V 33/00* | (2006.01) |
| *F21V 3/04* | (2006.01) |
| *F21W 131/302* | (2006.01) |
| *F21Y 103/00* | (2006.01) |

(52) U.S. Cl.
CPC ............ *H05B 33/0896* (2013.01); *F21V 3/049* (2013.01); *F21V 33/004* (2013.01); *H05B 37/0227* (2013.01); *F21W 2131/302* (2013.01); *F21Y 2103/003* (2013.01)

(58) Field of Classification Search
CPC ............. F21V 3/049; F21W 2131/302; F21W 2101/08; F21Y 2101/02; F21Y 2103/003; F21Y 2105/003; H01L 2924/12041; H05B 37/02; H05B 37/0218; H05B 33/0806; H05B 33/0812; H05B 33/0815; H05B 33/0845
See application file for complete search history.

(56) References Cited

U.S. PATENT DOCUMENTS

| | | | |
|---|---|---|---|
| 8,356,908 B1* | 1/2013 | Zadro | 362/136 |
| 2010/0259200 A1* | 10/2010 | Beausoleil | 315/320 |
| 2011/0038150 A1* | 2/2011 | Woodgate et al. | 362/235 |
| 2012/0122970 A1* | 5/2012 | Carlier et al. | 514/464 |
| 2012/0299480 A1* | 11/2012 | Peting et al. | 315/113 |
| 2012/0307490 A1* | 12/2012 | Ellis | 362/235 |

FOREIGN PATENT DOCUMENTS

JP        02002090701        *    3/2002    ............ G02F 1/03

* cited by examiner

*Primary Examiner* — Vibol Tan
(74) *Attorney, Agent, or Firm* — William J. Benman; Benman, Brown & Williams (57) ABSTRACT

An illumination system comprising a light source with a linear array of light emitting elements and an arrangement for regulating power to the array whereby the light emitting elements emit light in accordance with a tapered gradient intensity profile. In the illustrative embodiment, the light source includes first and second linear arrays of light emitting elements and a mirror is mounted there between. The tapered profile begins at the waist of a user when a user is standing near and in front of the mirror. In the digital embodiment, a camera is included along with software for detecting the user's waist (or detecting the user's height and inferring therefrom said user's waist) and adjusting the profile based on the detection of the user's height or waist. Any intensity profile, e.g. ramp, Gaussian, etc., may be implemented and one or more such arrays may be used and mounted horizontally, vertically or both. Each array may have a different intensity or luminous profile. In addition, or as an alternative, to the intensity profile, other optical qualities, such as color, may be changed across one or more of the arrays.

19 Claims, 7 Drawing Sheets

SYSTEM AND METHOD FOR PROVIDING GRADIENT INTENSITY ILLUMINATION FOR LIGHTED MIRRORS FOR DRESSING ROOMS AND OTHER APPLICATIONS

REFERENCE TO RELATED APPLICATION

This is a Continuation-in-Part of copending U.S. patent application entitled ILLUMINATED MIRROR DESIGN AND METHOD, Ser. No. 13/134,229, filed May 30, 2011 by M. Ellis, the teachings of which are hereby incorporated herein by reference.

BACKGROUND OF THE INVENTION

1. Field of the Invention

The present invention relates to lighting systems. More specifically, the present invention relates to illumination systems used in dressing rooms and other applications.

2. Description of the Related Art

Due to the typical lighting arrangement, customers in a retail dressing room are all too often unhappy with the way they see themselves in the mirror while trying on clothes. (See *Effects of Dressing Room Lighting Direction on Consumers' Perception of Self and Environment*, Baumstarck, A., Park, N-K; University of Florida, 2009.) The perception is usually that the conditions in the room highlight, accentuate, and/or create under-eye bags, uneven skin tone and texture, wrinkles, less-than-desirable body fat distribution, cellulite, bulging veins, odd skin color, etc.

There are many blog and forum entries as well as articles on the subject on the Internet in which most women—and a surprising number of men—express agreement. For these people, the dressing room experience is often painful and seldom pleasant, and indeed affects their purchasing decisions. As a result, customers often choose: 1) to buy only what they perceive as absolutely necessary; 2) to take clothes home to try on in more pleasing conditions and then return what doesn't work; 3) to forego the entire experience and make their purchases on-line; or 4) all too often to buy nothing out of frustration and disappointment. Hence, in the apparel business it is often said that "the sale is made in the dressing room."

The problem is primarily an issue of lighting, with most dressing rooms being lit by overhead sources—usually fluorescent or halogen bulbs—that are often very harsh and/or color-distorted. Such lighting casts hard shadows, often at unflattering color temperatures, which are responsible for most of the unpleasant effects. But remarkably little has ever been done to optimize lighting conditions in retail dressing rooms in order to affect—i.e., increase—sales.

Conventional solutions include the use of fluorescent or incandescent sconces placed alongside the mirror. However, this approach offers little improvement inasmuch as the sconces typically don't give off enough light.

A few years ago, dressing room atmospherics as a factor in sales came on the radar in the apparel industry and consequently the retail design community. As a result, poor dressing room conditions have been cosmetically improved fairly recently: some rooms have been cleaned up, painted, provided with more hooks, and new carpeting. Higher-end shops made their dressing rooms a luxury haven, bringing in oversized gilt-frame mirrors and poufy furnishings. Some tried to deal with the lighting—usually by simply dimming and/or warming it to the point where it was difficult to see, i.e., near-candlelight.

Some stores, including a few chains, have employed side-lit mirrors, utilizing either fluorescent or incandescent lighting. Such side-lit mirrors are bulky and often unattractive, and require a high level of maintenance inasmuch as the bulbs burn out quickly. Also, these conventional systems generate substantial heat, which may affect a building's HVAC systems, and may present a potential burn risk for customers if not shielded properly. Other hazards include the possibility of broken or shattered glass, and the toxic release of mercury from broken fluorescent bulbs. Additionally, these conventional systems are generally part of the architecture of the space, and must be designed into the room; i.e., they cannot be dropped into any existing space.

Accordingly, a need remained in the art for an improved system or method for providing illumination for use with mirrors in retail dressing rooms.

U.S. patent application entitled ILLUMINATED MIRROR DESIGN AND METHOD, Ser. No. 13/134,229, filed May 30, 2011 by M. Ellis, the teachings of which are hereby incorporated herein by reference, addressed the need in the art by providing an illumination system of the present invention with an elongate rectangular mirror; a first diffuser mounted on a first side of said mirror in parallel relation along a longitudinal axis thereof; a second diffuser mounted on a second side of said mirror in parallel relation along said longitudinal axis; and an array of light emitting diodes mounted along an edge of said first and said second diffusers. The disclosed ELAVUE mirror is a modular integrated mirror and lighting unit or appliance that offers the potential to enhance customer perceptions of themselves in (and out of) the clothes they are considering, potentially resulting in longer stays, more clothing fittings, a more enjoyable shopping experience, and, ultimately, more sales.

While the ELAVUE system addressed the need in the art, it provides substantially uniform illumination from top to bottom. However, gradient illumination is now seen as more desirable inasmuch as when lighting is uniformly distributed up and down, it can create a subtle but noticeable effect (especially at higher intensities) of too much light coming from the lower part of the lighting panels, creating undesirable shadowing from below, and thus yielding a somewhat distorted, undesirable image in the mirror. The effect is similar to the unflattering shadowing effect of overhead lighting (mitigation of which is one of the biggest drivers behind the concept of the Elavue Mirror disclosed and claimed in the above-referenced Ellis application), only in reverse.

Thus, a need has been recognized for a solution that would soften and/or alleviate that effect by altering the distribution of light along the height of the panels such that the highest intensity comes from the general level of head and torso area, with fading to a much lower intensity from mid-height (approximately waist/hip area) to bottom/feet level. The lower part being still illuminated well enough to enhance viewing, differentiate colors, etc. (i.e., not completely unlit), but not as fully lit as the head/torso area.

SUMMARY OF THE INVENTION

The need in the art is addressed by the illumination system and method of the present invention adapted to provide a gradient or tapered illumination of dressing rooms and other environments. The present invention provides a solution that alters the distribution of light along the height of lighting panels such that the highest intensity comes from the general level of head and torso area, with fading to a much lower intensity from mid-height (approximately waist/hip) to bottom/feet level. The lower part is still illuminated well enough to enhance viewing, differentiate colors, etc., but not as fully lit as the head/torso area.

In an illustrative embodiment, the illumination system includes a light source including a linear array of light emitting elements and an arrangement for regulating power to the array whereby the light emitting elements emit light in accordance with a tapered gradient intensity profile.

The light source includes first and second linear arrays of light emitting elements and a mirror is mounted there between. In accordance with the present teachings, the tapered profile begins at the waist of a user when a user is standing near and in front of the mirror. In the digital embodiment, a camera is included along with software for detecting the user's waist (or detecting the user's height and inferring therefrom the user's waist) and adjusting the profile based on the detection of the user's height or waist.

Any intensity profile, e.g. ramp, Gaussian, etc., may be implemented and one or more such arrays may be used and mounted horizontally, vertically or both. Each array may have a different intensity or luminous profile. In addition, or as an alternative, to the intensity profile, other optical qualities, such as color, may be changed across one or more of the arrays.

The invention is not limited to light emitting diodes. Organic light emitting elements may be used as well as other types of light emitting devices.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention is a lighted mirror design and method. The inventive mirror provides a means for optimizing lighting and viewing conditions in the dressing room, where the sale is often ultimately made, thereby improving customer experience in a store and increasing clothing sales.

Figure 1:
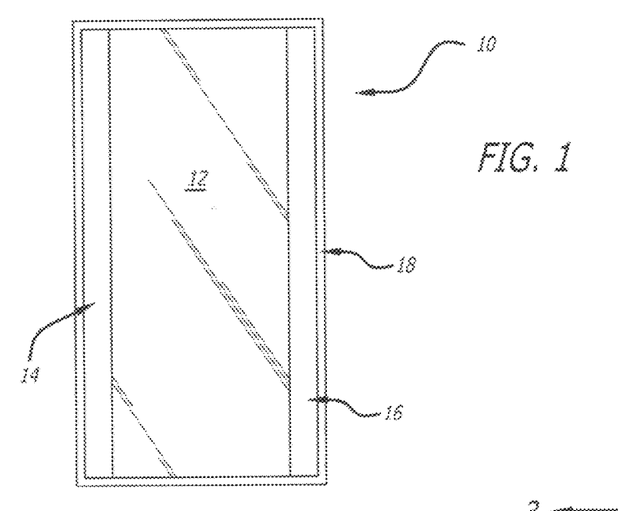
FIG. 1 is a frontal view of an illustrative embodiment of a lighted mirror implemented in accordance with the teachings of the present invention.

FIG. 1 is a frontal view of an illustrative embodiment of a modular integrated lighted mirror implemented in accordance with the teachings of the present invention. The system 10 includes a mirror 12 fabricated of glass, metal, Plexiglas or other suitably reflective surface. In the best mode, the mirrors are fabricated of standard high-quality (e.g. ¼ inch) distortion-free glass. The mirror 12 is planar and has a longitudinal axis not shown along the length thereof. In the illustrative embodiment, the mirror is 24 inches by 72 inches. However, the present teachings are not limited to the size or shape of the mirror. The mirror is sandwiched between two illumination elements 14 and 16 and is disposed within an optional decorative frame 18.

The illumination elements 14 and 16 are light diffusers that distribute light from light emitting diodes (LEDs), organic light emitting diodes OLEDS or other suitable light emitting devices. The arrangement of LEDs is illustrated more clearly with reference to FIGS. 2 and 3.

Figure 2:
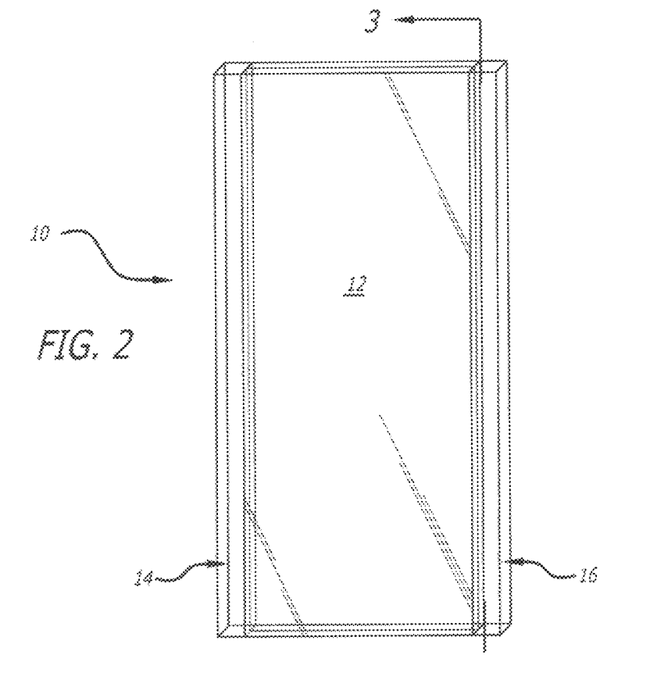
FIG. 2 is a simplified schematic perspective view of the lighted mirror of FIG. 1.

FIG. 2 is a simplified schematic perspective view of the lighted mirror of FIG. 1. In accordance with the teachings of the above-referenced Ellis '229 application, the teachings of which have been incorporated herein by reference, the LEDs are each powered with the same amount of energy. Accordingly, the light output by the LEDs is uniform and exhibit a flat profile as illustrated in FIG. 3.

Figure 3:
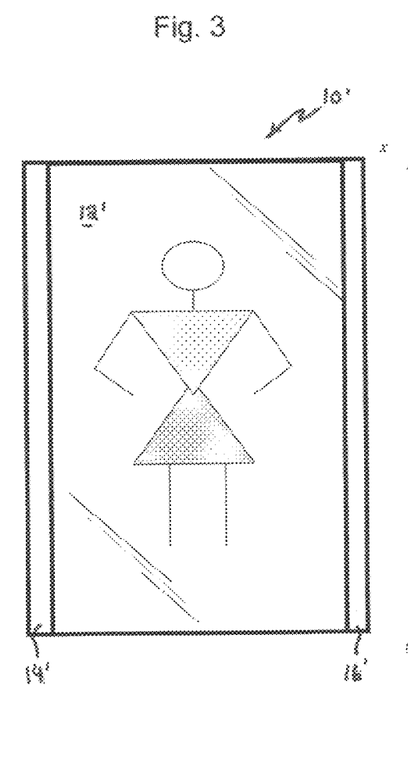
FIG. 3 is a diagram that illustrates the light output profile of a lighted mirror implemented in accordance with the teachings of prior filed the Ellis '229 application.
Figure 3A:
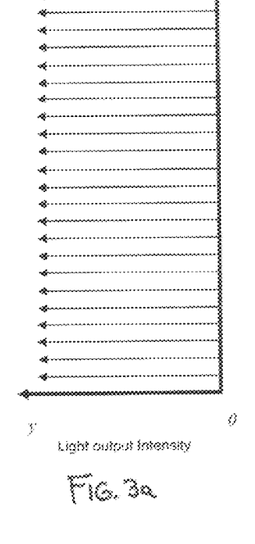
FIG. 3a illustrates the light output intensity profile distribution of the first LED array as a function of location from the bottom of the array to the top thereof.
Figure 3B:
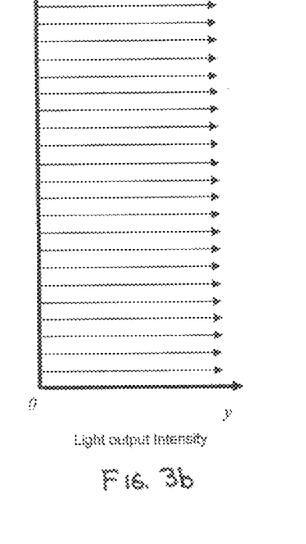
FIG. 3b illustrates the light output intensity profile distribution of the second LED array as a function of location from the bottom of the array to the top thereof.

FIG. 3 is a diagram that illustrates the light output profile of a lighted mirror implemented in accordance with the teachings of prior filed the Ellis '229 application. FIG. 3a illustrates the light output intensity profile distribution of the first LED array 14' as a function of location from the bottom of the array to the top thereof. FIG. 3b illustrates the light output intensity profile distribution of the second LED array 16' as a function of location from the bottom of the array to the top thereof. The intensity distribution profile is relatively uniform from top to bottom. As noted above, this can create a subtle but noticeable effect (especially at higher intensities) of too much light coming from the lower part of the lighting panels and thereby create undesirable shadowing from below. This can yield a somewhat distorted, undesirable image in the mirror. The effect is similar to the unflattering shadowing effect of overhead lighting (mitigation of which is one of the biggest drivers behind the concept of the Elavue Mirror disclosed and claimed in the above-referenced Ellis application), only in reverse.

In accordance with the present teachings, the light output intensity distribution profile is diminished to address the shortcomings of the flat intensity distribution profile of the '229 application set forth above. This is illustrated in FIG. 4 below.

Figure 4:
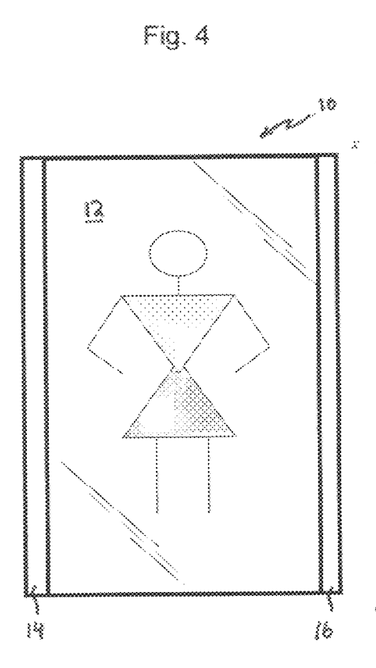
FIG. 4 is a diagram that illustrates the light output profile of a lighted mirror implemented in accordance with the teachings of the present application.
Figure 4A:
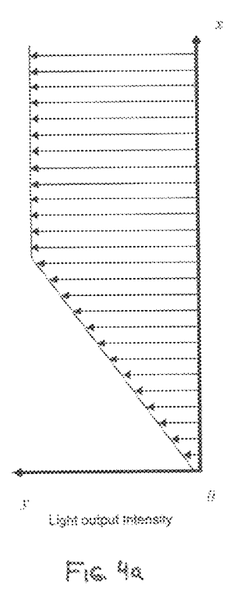
FIG. 4a illustrates the light output intensity profile distribution of a first array of light emitting elements, powered in accordance with present teachings to provide a tapered output intensity distribution profile, as a function of location from the bottom of the array to the top thereof.
Figure 4B:
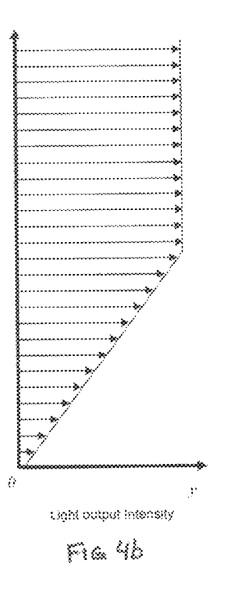
FIG. 4b illustrates the light output intensity profile distribution of a second array of light emitting elements, powered in accordance with present teachings to provide a tapered output intensity distribution profile, as a function of location from the bottom of the array to the top thereof.

FIG. 4 is a diagram that illustrates the light output profile of a lighted mirror implemented in accordance with the teachings of the present application. FIG. 4a illustrates the light output intensity profile distribution of a first array of light emitting elements 14, powered in accordance with present teachings to provide a tapered output intensity distribution profile, as a function of location from the bottom of the array to the top thereof. FIG. 4b illustrates the light output intensity profile distribution of a second array of light emitting elements 16, powered in accordance with present teachings to provide a tapered output intensity distribution profile, as a function of location from the bottom of the array to the top thereof.

Figure 5:
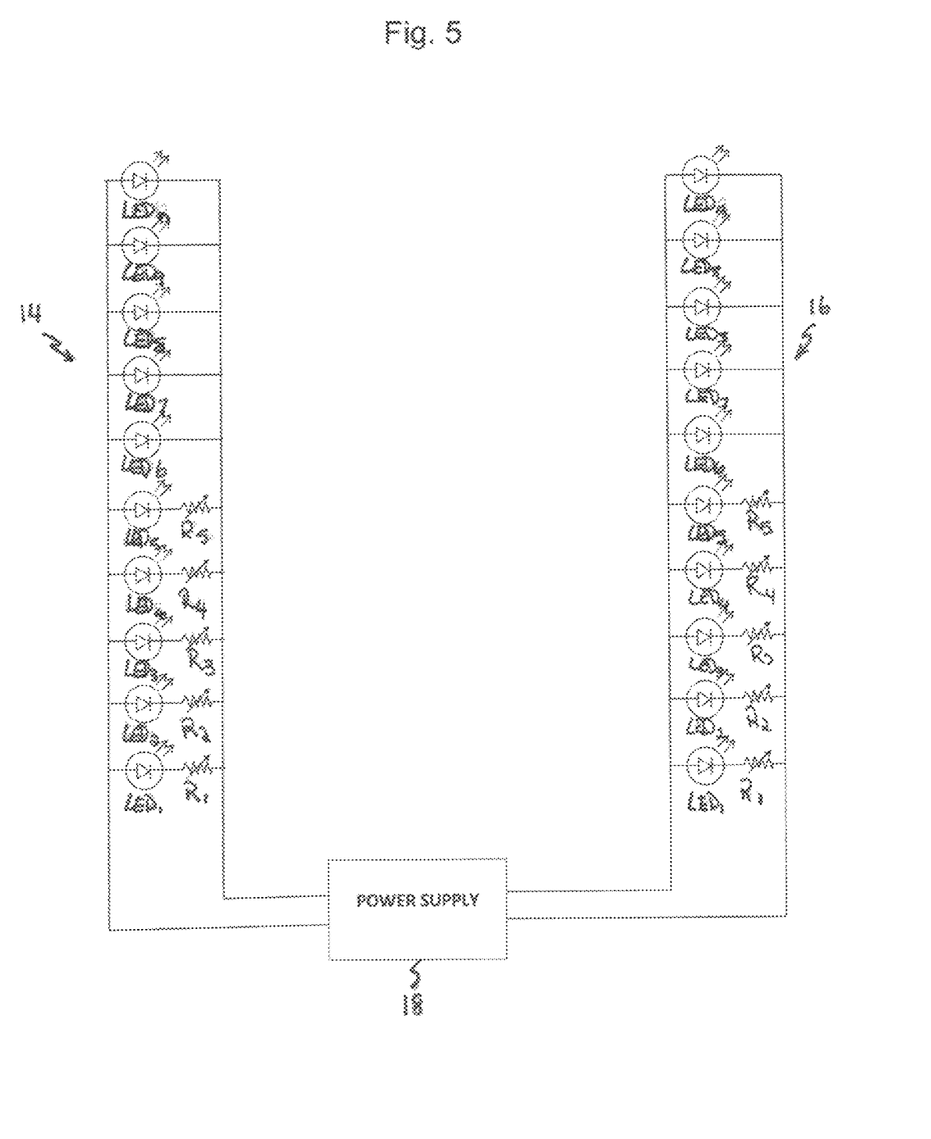
FIG. 5 is a simplified schematic diagram of an illustrative analog implementation of a scheme for effecting the tapered output light intensity distribution profile of FIGS. 4a and 4b.

FIG. 5 is a simplified schematic diagram of an illustrative analog implementation of a scheme for effecting the tapered output light intensity distribution profile of FIGS. 4a and 4b. As shown in the figure, the light emitting elements, represented by $LEDs_{1-n}$ receive power from a power supply 18. The power supply 18 is designed or chosen to power the light emitting elements in the arrays 14 and 16 to provide adequate and optimized lighting for the intended environment in accordance with the teachings of the Ellis '229 application. However, in accordance with the present teachings, a resistor R is connected in series with a number of light emitting elements but not all. These resistors may be fixed or variable. In any case, in the best mode, the resistance of the inserted resistors $R_5$–$R_1$ increases from waist level down to the bottom of the array such that the light output decreases from the waist to the bottom of the array and thereby provides the intensity distribution profile shown in FIGS. 4a and 4b.

Figure 6:
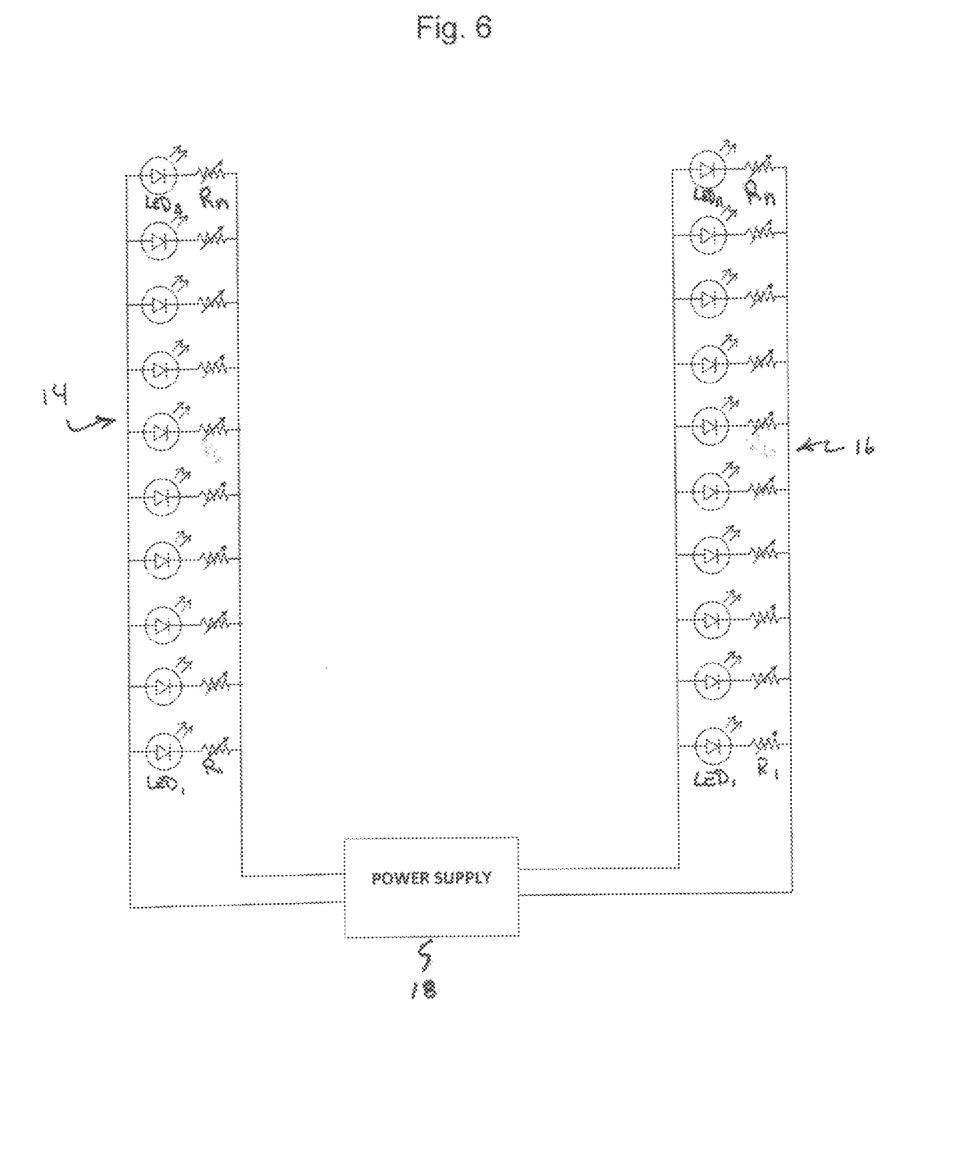
FIG. 6 shows an alternative analog implementation of the power regulation scheme depicted in FIG. 5 in which each light emitting element is connected in series with a resistor to allow for more variety in the intensity distribution profile across the full length of each light emitting array.

FIG. 6 shows an alternative analog implementation of the power regulation scheme depicted in FIG. 5 in which each light emitting element is connected in series with a resistor to allow for more variety in the intensity distribution profile across the full length of each light emitting array. While fixed resistors may be used, one of ordinary skill in the art will appreciate that the use of variable resistors allows for adjustment of the resistance of the resistors in the field at or after installation. In any case, FIGS. 5 and 6 depict analog implementations of a power distribution and regulation scheme for effecting a desired intensity distribution profile.

Figure 7:
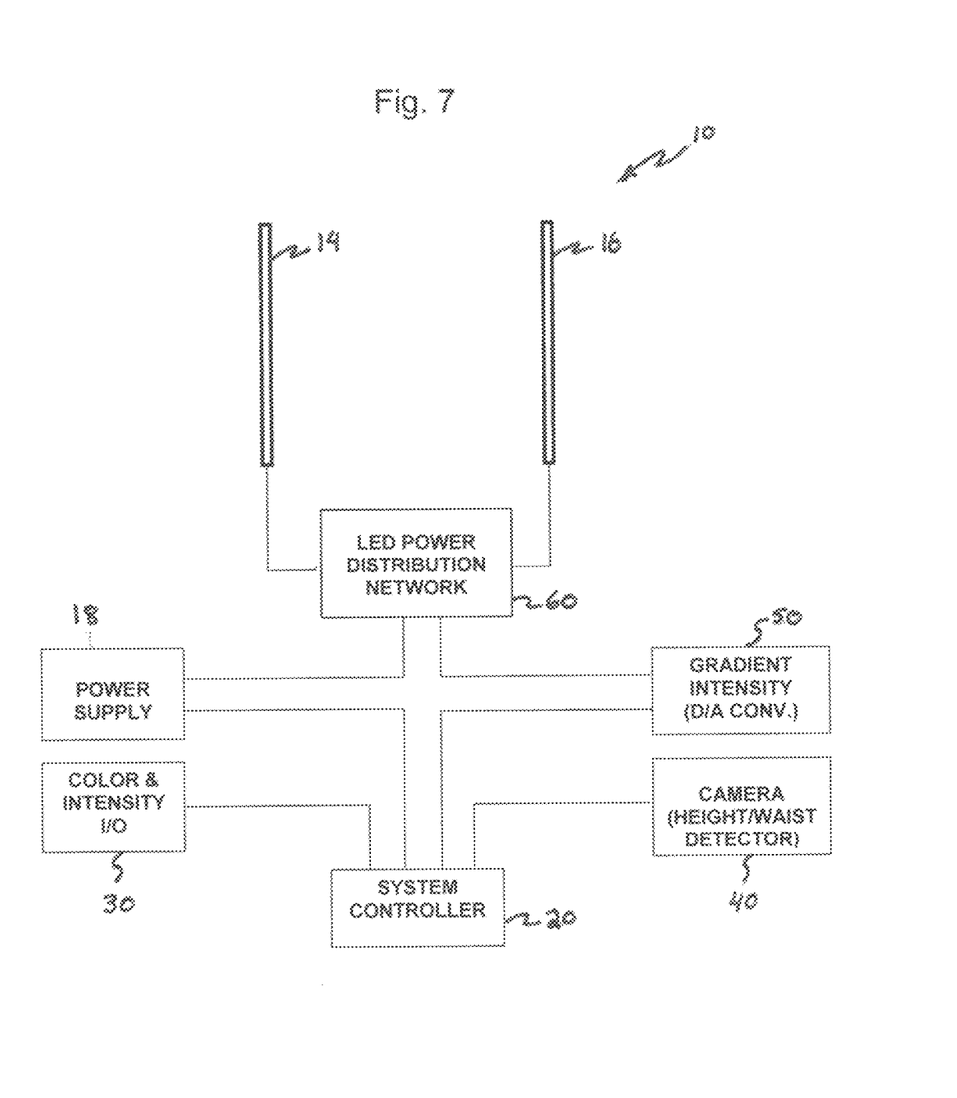
FIG. 7 shows an illustrative embodiment of a digital scheme for effecting a desired intensity distribution profile in accordance with the present teachings.

FIG. 7 shows an illustrative embodiment of a digital scheme for effecting a desired intensity distribution profile in accordance with the present teachings. In this embodiment, the power supply is coupled to arrays of light emitting elements 14 and 16 through a power distribution network 60 under control of a system controller 20. The system controller 20 may be implemented with a microprocessor or digital logic circuit. The system controller 20 receives input from an optional color and/or intensity user interface 30 and an optional camera or height waist detector 40. The height/waist detector may be also be implemented with a simple laser and optical detector. In any case, the detected height of the user, or the camera image, is processed in software running on a tangible medium in the controller to determine the optimum intensity distribution profile for a given user. In most cases, the waist of the user is 50% of the user's height. A more sophisticated implementation might find a user's waist by examining the user's shape.

In any case, the system controller outputs digital signals required to effect an optimum intensity distribution profile to a bank of digital to analog converters 50. The D/A converters convert the digital signals to analog signals to power each light emitting element in each array. This is depicted in more detail in FIG. 8.

Figure 8:
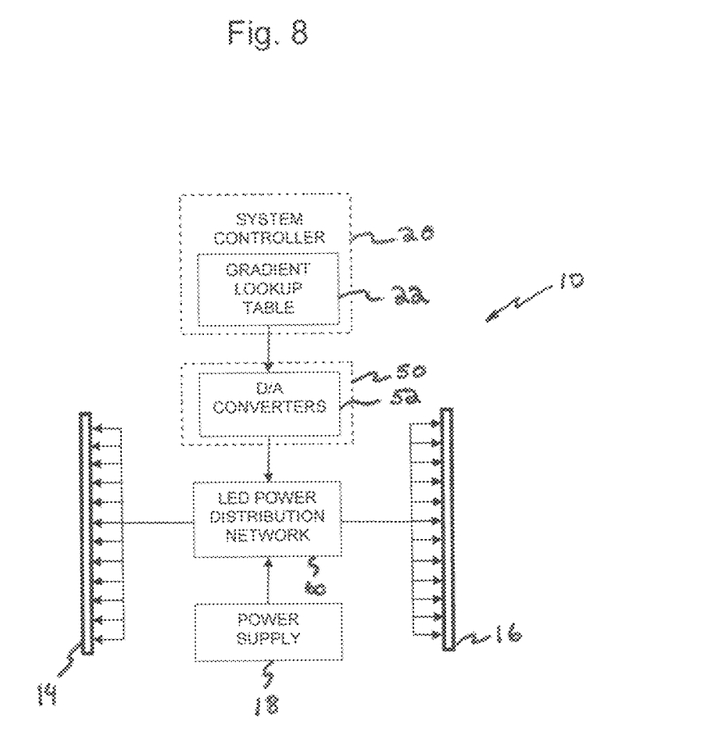
FIG. 8 is a more detailed block diagram of the digital scheme for effecting a desired intensity distribution profile depicted in FIG. 7.

FIG. 8 is a more detailed block diagram of the digital scheme for effecting a desired intensity distribution profile depicted in FIG. 7. In the illustrative embodiment, the system controller 20 determines an optimal profile and outputs controls via a gradient lookup table 22. The lookup table 22 is fed to the D/A converters 52 in the gradient intensity control module 50. Those skilled in the art will appreciate that the module 50 can be implemented with a single D/A converter and a bank of digitally controlled resistors without departing from the scope of the present teachings. As another alternative, the system controller may output the needed voltage levels directly via digitally potentiometer. In either case, the analog output control signals are fed to the power distribution network 60 and amplified as necessary to power the light emitting elements in the arrays 14 and 16 with the desired output intensity profile.

The present invention has been described herein with reference to a particular embodiment for a particular application. Those having ordinary skill in the art and access to the present teachings will recognize additional modifications, applications and embodiments within the scope thereof. For example, any desired profile can be achieved with the present teachings and each array can have a different output intensity and/or profile. With use of multiply colored light emitting elements, the colors of each array can be adjusted as well. The arrays may be mounted vertically or horizontally and the present teachings are not limited to the use of linear arrays. The light elements can be other shapes including square, rectangular, circular, irregular, etc. without departing from the scope of the present teachings.

It is therefore intended by the appended claims to cover any and all such applications, modifications and embodiments within the scope of the present invention.

Accordingly,

What is claimed is:

1. An illumination system comprising:
   a light source including a linear array of light emitting elements;
   means for supplying power to said array; and
   means for regulating said power to said array whereby said light emitting elements emit light in accordance with a tapered gradient intensity profile, said profile being graphically a ramp.

2. The invention of claim 1 wherein said light source includes first and second linear arrays of light emitting elements.

3. The invention of claim 2 including a mirror mounted between said first and second linear arrays of light emitting elements.

4. The invention of claim 2 wherein said elements are organic light emitting diodes.

5. The invention of claim 3 wherein said tapered profile begins at the waist of a user when a user is standing near and in front of said mirror.

6. The invention of claim 5 further including means for detecting said user's waist.

7. The invention of claim 6 further including means for detecting said user's height and inferring therefrom said user's waist.

8. The invention of claim 7 further including means for adjusting the profile based on the detection of said user's height or waist.

9. The invention of claim 1 further including means for providing any intensity profile in said array.

10. The invention of claim 9 further including means for digitally actuating said light emitting elements.

11. The invention of claim 1 wherein said array is mounted vertically.

12. The invention of claim 1 wherein said array is mounted horizontally.

13. The invention of claim 1 wherein said profile is a Gaussian distribution.

14. The invention of claim 1 further including means for changing one or more color qualities of light output by said array.

15. The invention of claim 14 wherein one of said color qualities is color temperature.

16. The invention of claim 15 wherein said means for changing color temperature includes light emitting elements of different colors mounted in said array and means for selectively activating said chips to achieve a desired color temperature.

17. An illumination system comprising:
a light source having first and second linear arrays of light emitting elements;
a mirror mounted between said first and second linear arrays of light emitting elements;
a power supply coupled to each of said arrays; and
circuitry for regulating said power to said arrays whereby said light emitting elements emit light in accordance with a tapered gradient intensity profile, said tapered gradient intensity profile beginning at the waist of a user when the user is standing near and in front of said mirror.

18. The invention of claim 17 further including means for detecting said user's waist.

19. An illumination method including the steps of:
providing a light source having first and second linear arrays of light emitting elements;
mounting a mirror between said first and second linear arrays of light emitting elements;
coupling a power supply to each of said arrays; and
regulating said power to said arrays whereby said light emitting elements emit light in accordance with a tapered gradient intensity profile beginning at the waist of a user when a user is standing near and in front of said mirror.

* * * * *